(12) United States Patent
Neuhaus

(10) Patent No.: US 6,474,699 B1
(45) Date of Patent: Nov. 5, 2002

(54) PRESS FITTING ELEMENT

(75) Inventor: Ulrich Neuhaus, Haan (DE)

(73) Assignee: Mapress GmbH & Co. KG, Langenfeld (DE)

( * ) Notice: Subject to any disclaimer, the term of this patent is extended or adjusted under 35 U.S.C. 154(b) by 12 days.

(21) Appl. No.: 09/643,435

(22) Filed: Aug. 22, 2000

(30) Foreign Application Priority Data

Aug. 31, 1999 (DE) .......................................... 199 42 609

(51) Int. Cl.$^7$ ................................................ F16L 17/00

(52) U.S. Cl. ......................... 285/379; 29/508; 285/382

(58) Field of Search ........................... 29/508; 285/382, 285/382.2, 379

(56) References Cited

U.S. PATENT DOCUMENTS

| | | | | |
|---|---|---|---|---|
| 5,007,667 A | * | 4/1991 | Unewisse et al. | 285/382.2 |
| 5,121,625 A | * | 6/1992 | Unewisse et al. | 29/508 |
| 5,168,618 A | * | 12/1992 | Unewisse et al. | 29/508 |
| 6,049,962 A | * | 4/2000 | Pfeiffer | 285/382.2 |

FOREIGN PATENT DOCUMENTS

| | | | |
|---|---|---|---|
| DE | 38 34 353 C1 | | 3/1990 |
| EP | 0361630 A1 | * | 4/1990 |

OTHER PUBLICATIONS

Brochure by mapress mannesmann pressfitting–system, Lieferprogramm Sanitär, Heizung, Sep. 1998, pp. 1–45.
Brochure by mapress mannesmann pressfitting–system, mapress Kupfer, Eine optimale Verbindung von Fitting und Rohr, Mar. 1999.

* cited by examiner

Primary Examiner—Eric K. Nicholson
Assistant Examiner—Aaron M Dunwoody
(74) Attorney, Agent, or Firm—Henry M. Feiereisen

(57) ABSTRACT

A metallic press fitting element for providing a non-detachable, tight joint of pipes includes a main body which is defined by a longitudinal axis. The main body is comprised of a radially outwardly projecting bead area at an entry side of a pipe to be inserted, a first cylindrical portion extending inwardly, at a distance to the entry side, of the bead area and connected thereto via a slanted transition, and a second cylindrical portion extending inwardly of the first cylindrical portion at formation of a stop surface for the pipe being inserted. The bead area terminates in a straight end portion which extends perpendicular to the longitudinal axis in a radial direction and has a terminal end which bounds a circular opening. The straight end portion has a wall thickness which is equal to a wall thickness of the bead area and the first cylindrical portion, whereby the transition between the first cylindrical portion and the bead area has an inside slant which extends in relation to a horizontal at an angle of 34° to 37°, thereby reducing an axial length of the bead area compared to conventional press fitting elements. Received in the bead area is a sealing ring which forms a torus in non-deformed condition and has an inner diameter which is at least equal to or greater than an inner diameter of the first cylindrical portion.

6 Claims, 2 Drawing Sheets

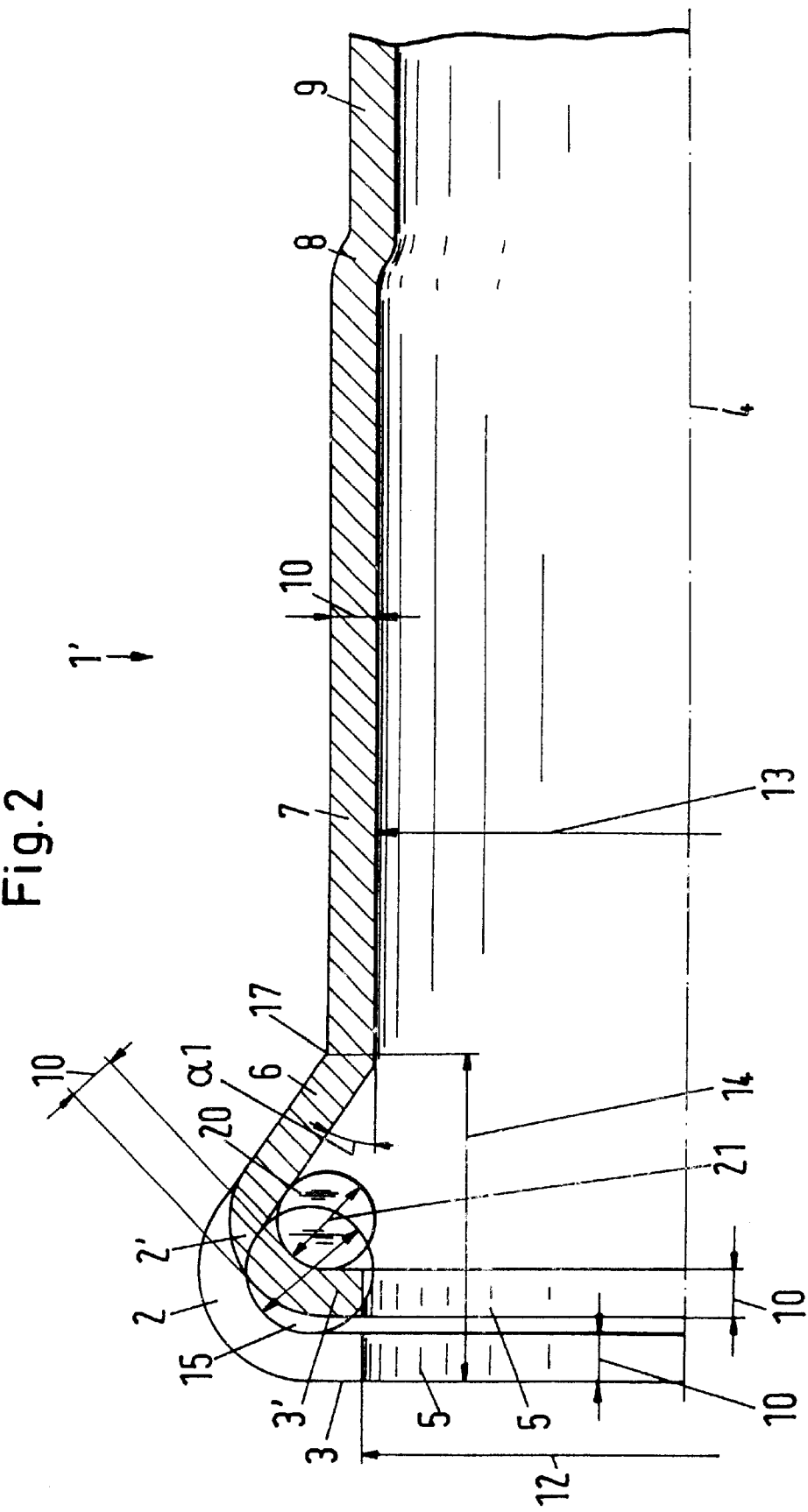

PRESS FITTING ELEMENT

CROSS-REFERENCES TO RELATED APPLICATIONS

This application claims the priority of German Patent Application Serial No. 199 42 609.0, filed Aug. 31, 1999.

BACKGROUND OF THE INVENTION

The present invention relates, in general, to press fitting elements, and in particular to a metallic press fitting element.

A press fitting system of carbon steel or high-alloy steel as well as copper for home installation is known, for example from published brochures by mapress mannesmann pressfitting-system, Lieferprogramm Sanitär, Heizung, September 1998, or mapress Kupfer March 1999. This system includes essentially a deformable press fitting element which is available in many designs, e.g. as elbow, T-piece, coupling or adapter, and has a radially outwardly projecting bead area for interiorly accommodating a sealing ring. Formed inwardly of and connected to the bead area via a slanted transition is a cylindrical portion which extends in longitudinal direction. At the end, the cylindrical portion is formed with a radially inwardly projecting crease-like depression for providing a stop surface for a pipe being inserted into the pipe fitting element and having a smooth end. The bead area terminates in a straight end portion, as viewed in longitudinal cross section, and extends perpendicular to the longitudinal axis of the press fitting element. The wall thickness of the straight end portion equals the wall thickness of the bead as well as of the cylindrical portion, and the terminal radial end of the straight end portion bounds a circular opening. The inner diameter of the non-deformed sealing ring, which forms a torus, is at least equal to or greater than the inner diameter of the cylindrical portion.

By applying two clamping jaws of a pressing tool, the bead area is subject to a plastic deformation whereas the trapped sealing ring is subject to an elastic deformation. In addition, during this pressing process, a crease-like depression is formed in the cylindrical portion of the press fitting element in immediate proximity of the bead and penetrates also the pipe located underneath. The elastically deformed sealing ring assumes in this joint system the sealing function, while the formed crease-like depression absorbs longitudinal forces applied by the internal pressure as well as a fraction of the torque. During plastic deformation of the bead, a more or less pronounced burr formation is unavoidable in the closing zone of the clamping jaws. Size and type of the burr depends on the contour of the press fitting element, on the flow behavior of the material being squeezed, and on the tolerances between the pair of press fitting element—clamping jaw. A comparison of materials used in the sanitary and heating fields, that is carbon steel, high-alloy steel and copper, clearly shows that the flow behavior of copper greatly deviates from the flow behavior of steel. Thus, to use the proven contour of a press fitting element of steel for press fitting elements of copper is unfavorable as far as burr formation is concerned. As a matter of fact, also the burr formation in press fitting elements of steel is not satisfactory at all to date.

Since introduction of the pressing process of a fitting with inserted pipe more than 25 years ago, pressing tools with clamping jaws that match a nominal size being respectively pressed are increasingly available on the market. Currently, there are more than 150,000 clamping jaws on the market. The advantage of pipe joints by a pressing process instead of welding, soldering, screwing, or sticking has been recognized in the meantime even by such conservative users involved in the heating and sanitary fields so that a need is created to expand the field of application of the pressing process also for use with materials other than carbon steel or high-alloy steel. The manufacturer of such pressing systems has to take into account thereby the possibly different flow behavior of materials newly included in the system. For example, this is evident for copper compared to carbon steel or high-alloy steel. One proposal involved the adaptation of the contour of the clamping jaw to the different flow behavior. This, however, requires the user to stock two sets of tools for each nominal size, rendering this proposal cost-intensive and entailing a risk of confusion as well as requiring greater spatial demands. These shortcomings evidently convinced the users to reject this proposal and the need to double the number of clamping jaws to be stocked.

SUMMARY OF THE INVENTION

It is thus an object of the present invention to provide an improved press fitting element, obviating the afore-stated drawbacks.

In particular, it is an object of the present invention to provide an improved press fitting element of metal, in particular copper, which can be pressed together with an inserted pipe, regardless of the flow behavior of the material being used while utilizing the commercially available clamping jaws of a pressing tool with proven cross section for differently standardized dimensions and yet attaining an unobjectionable quality without undesired burr formation.

These objects, and others which will become apparent hereinafter, are attained in accordance with the present invention by providing, at a same nominal wall thickness of the cylindrical portion and the bead area including the radially extending straight end portion, the transition between the cylindrical portion and the bead area with an inside slant which extends in relation to a horizontal at an angle of 34° to 37°, thereby reducing an axial length of the bead area compared to conventional press fitting elements.

The configuration of a press fitting element in accordance with the present invention has the effect that at a same depth of penetration of the clamping jaw, the volume being squeezed is smaller so that burr formation is eliminated or at least appreciably diminished. Still, the sealing ring is sufficiently compressed elastically to maintain the sealing action at operating conditions. This is also helped by dimensioning the circular opening, which is bounded by the radially extending straight end portion, with a diameter that is greater than the inner diameter of the cylindrical portion by 0.8 mm±0.2 mm. This prevents a premature contact of the straight end portion upon the pipe during pressing process and an interference with the pressing action of the bead area.

Tests have shown that the proposed contour of the press fitting element leads to a reduced burr formation, regardless of the material being used. However, the change in contour is still not sufficient for press fitting elements of copper. Therefore, according to another feature of the present invention, the cord diameter of the sealing ring, associated to a nominal size, is reduced and the bead area is decreased to a same extent. The nominal wall thickness is retained, as is the diameter of the circular opening of the radially extending straight end portion. The decrease of the cord diameter of the sealing ring is at least 0.2 mm, preferably 0.5 mm, in order to implement the desired effect. A decrease of the cord diameter by more than 1 mm may result in leakage.

BRIEF DESCRIPTION OF THE DRAWING

The above and other objects, features and advantages of the present invention will be more readily apparent upon reading the following description of preferred exemplified embodiments of the invention with reference to the accompanying drawing, in which:

FIG. 2 is a longitudinal section through half of a press fitting element of copper, in accordance with the present invention.

DETAILED DESCRIPTION OF PREFERRED EMBODIMENTS

Figure 1:
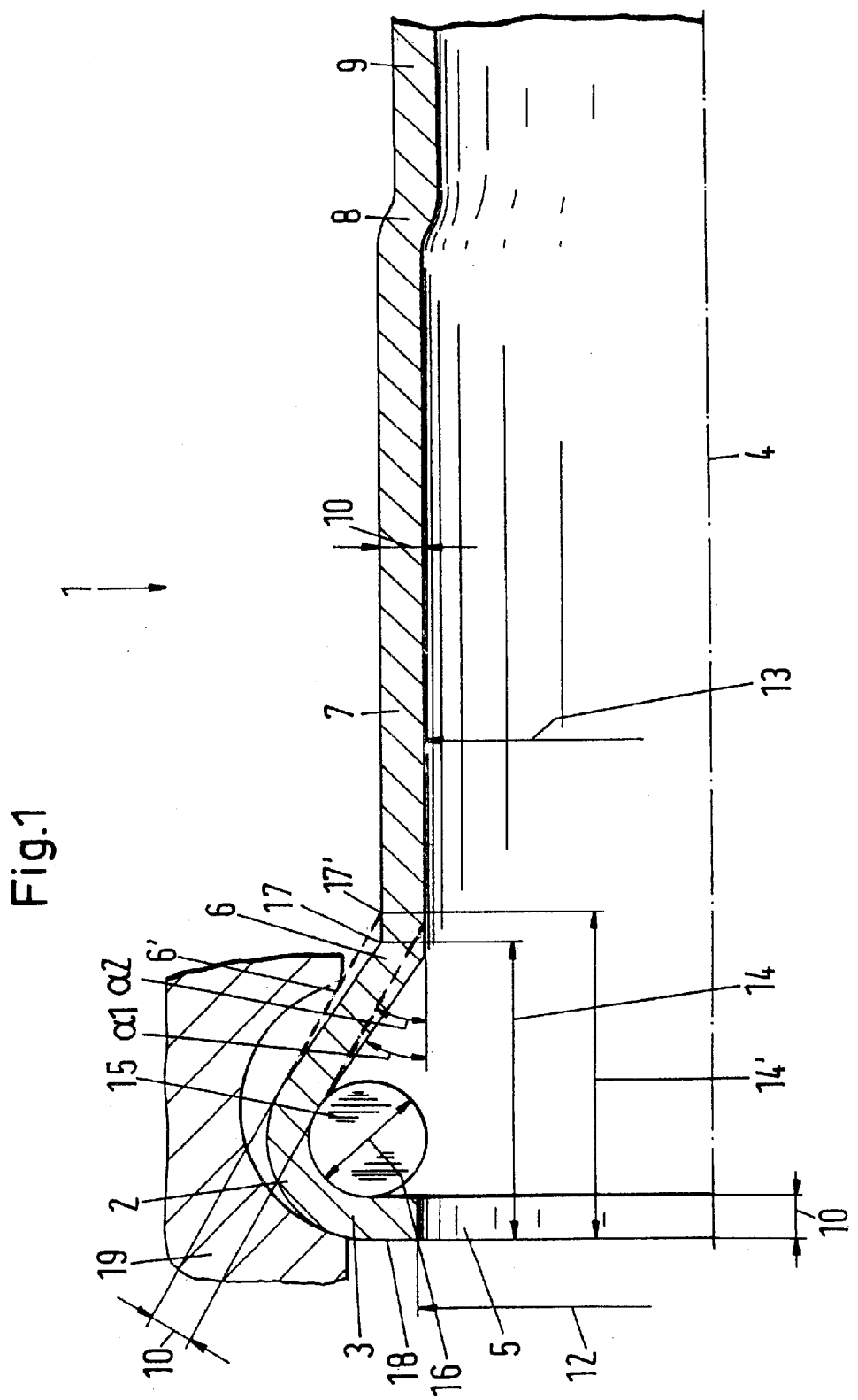
FIG. 1 is a longitudinal section through half of a press fitting element according to the present invention.

Throughout all the Figures, same or corresponding elements are generally indicated by same reference numerals.

Turning now to the drawing, and in particular to FIG. 1, there is shown a longitudinal section through half of a press fitting element according to the present invention, generally designated by reference numeral 1 for connection to a pipe (not shown). The press fitting element 1 has a main body which defines a longitudinal axis 4 and includes in the area of entry of the pipe to be joined a radially outwardly projecting bead area 2 for accommodating interiorly a sealing ring 15. In FIG. 1, the sealing ring 15 is still in non-deformed condition and has a cord diameter 16 which is associated to a nominal size and corresponds to the typical cord diameter of conventional press fitting elements made of carbon steel or high-alloy steel. For example, the cord diameter 16 is 4 mm for the nominal size of 54 mm.

The bead 2 terminates at the entry side of the pipe being inserted in a straight end portion 3 which extends perpendicular to the longitudinal axis 4 in a radial direction, whereby the terminal end of the radially extending straight end portion 3 bounds a circular opening 5. Extending inwardly of the bead 2 is a slanted portion 6 which forms a transition to a first cylindrical portion 7. At its end, the cylindrical portion 7 is connected to a second cylindrical portion 9 of reduced diameter so that a crease-shaped depression 8 is defined between the cylindrical portions 7, 9 for providing a stop surface for the pipe being inserted.

A particular feature of the main body of the press fitting element 1 is the fact that the cylindrical portion 7, the bead 2 and the straight end portion 3 have a same nominal wall thickness 10 which is of 1.4 to 1.5 mm. The slight reduction of the wall thickness in particular in the deformation zone of the bead 2 is negligible and can be ignored. In accordance with the present invention, the slanted portion 6, which forms the transition from the cylindrical portion 7 to the bead 2, is defined on the inside by an angle α1 in the range of 34° to 37° with respect to the horizontal. For better understanding and comparative purposes, the difference in change of the configuration of the slanted portion 6 according to the present invention, is indicated in FIG. 1 through incorporation, without hatching and in broken line, of the typical contour of a slanted transition 6' of known press fitting elements. As clearly evident by a comparison, the conventional slanted transition 6' has a flatter configuration and the slant has a smaller angle α2 with respect to the horizontal. As a consequence of the steeper profile of the transition 6, the so-called B-value of the press fitting element according to the present invention and labeled by reference numeral 14 is decreased compared to the B-value of the conventional press fitting element, labeled 14'. In the description the term B-value denotes the axial length of the bead 2, i.e. the distance between edge 17, (17' for the conventional press fitting element) at the juncture from the cylindrical portion 7 to the slanted transition 6, (6' for the conventional press fitting element) and the outer end face 18 of the straight end portion 3. As the B-value 14 is reduced compared to the B-value of the conventional press fitting element, a clamping jaw 19 of a pressing tool can act upon the bead 2 and the transition 6 at a deeper location, i.e. shifted more in the direction of the longitudinal axis 4, so that a lesser volume is being squeezed.

Suitably, the diameter 12 of the circular opening 5, bounded by the straight end portion 3, is greater by 0.8 mm±0.2 mm than the inner diameter 13 of the cylindrical portion 7, thereby preventing a premature contact of the straight end portion end 3 upon the pipe being inserted before the clamping jaws 19 are closed. This promotes a proper pressing action as the required remaining deformation of the bead 2 is not interfered with by the straight end portion 3.

FIG. 2 shows a longitudinal section through half of a press fitting element of copper, in accordance with the present invention, generally designated by reference numeral 1' and differing from the press fitting element 1 by the reduced cord diameter 21 of the sealing ring 20 compared to the cord diameter 16, as referred to in FIG. 1. The bead area 2' of the main body is therefore reduced in a same ratio. For better understanding and comparative purposes, the difference in change between the bead 2', including the straight end portion 3' and the sealing ring 20, and is indicated in FIG. 2, whereby the contour of bead 2, including straight end portion 3 and sealing ring 15 of the press fitting element 1 is shown without hatching and in broken line. Persons skilled in the art will understand that the differences shown in FIG. 2 have been exaggerated for ease of illustration and are actual smaller in reality. The other parameters such as same nominal wall thickness 10 for the cylindrical portion 7, the bead 2' and the straight end portion 3 as well as the steeper angle α1 in the range of 34° to 37° are maintained.

When using the clamping jaw 19, shown in FIG. 1 in the situation shown in FIG. 2, it is clear that the reduction of the cord diameter 21 and the accompanying decrease of the bead 2' leads to a further shift of the clamping jaw 19 in the direction of the longitudinal axis 4, so that the volume to be deformed is accordingly reduced as well. As a consequence a desired decrease of burr formation is realized.

While the invention has been illustrated and described as embodied in a press fitting element, it is not intended to be limited to the details shown since various modifications and structural changes may be made without departing in any way from the spirit of the present invention.

What is claimed as new and desired to be protected by letters patent is set forth in the appended claims:

1. A metallic press fitting element for providing a non-detachable, tight joint of pipes, comprising a main body defined by a longitudinal axis and having a radially outwardly projecting bead area at an entry side of a pipe to be inserted, a first cylindrical portion extending inwardly, at a distance to the entry side, of the bead area and connected thereto via a slanted transition, a second cylindrical portion extending inwardly of the first cylindrical portion at formation of a stop surface for limiting a movement of the pipe being inserted, said bead area terminating in a straight end portion which extends perpendicular to the longitudinal axis in a radial direction and has a terminal end which bounds a circular opening, said straight end portion having a wall thickness which is equal to a wall thickness of the bead area and of the first cylindrical portion; and a sealing ring received in the bead area and forming a torus in an non-deformed condition, said sealing ring having an inner diameter which is at least equal to or greater than an inner diameter of the first cylindrical portion, wherein the bead area with contained sealing ring and the first cylindrical portion define a pressing zone which is acted upon by at least two clamping jaws of a pressing tool, when the clamping jaws are closed, wherein the circular opening has a diameter which is greater than the inner diameter of the first cylindrical portion by 0.8 mm±0.2 mm.

2. The press fitting element of claim 1 wherein the cord diameter of the sealing ring remains unchanged when the main body is made of carbon steel or high alloy steel.

3. The press fitting element of claim 1 wherein the cord diameter of the sealing ring is smaller, when the main body is made of copper, than the cord diameter of the sealing ring, when the main body is made of carbon steel or high alloy steel.

4. The press fitting element of claim 3 wherein the reduction in size of the diameter of the sealing ring is at least 0.2 mm.

5. The press fitting element of claim 4 wherein the reduction in size of the diameter of the sealing ring is 0.5 mm.

6. The press fitting element of claim 1 wherein the transition between the first cylindrical portion and the bead area has an inside slant which extends in relation to a horizontal at an angle of 34° to 37°.

* * * * *